United States Patent
Krugliak et al.

(10) Patent No.: US 10,975,688 B2
(45) Date of Patent: Apr. 13, 2021

(54) METHODS AND SYSTEMS WITH DOWNHOLE SYNCHRONIZATION BASED ON A DIRECT DIGITAL SYNTHESIZER (DDS)

(71) Applicant: Halliburton Energy Services, Inc., Houston, TX (US)

(72) Inventors: Zinovy B. Krugliak, Houston, TX (US); Matthew Chase Griffing, Kingwood, TX (US); Imran Sharif Vehra, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/781,536

(22) PCT Filed: Jun. 20, 2017

(86) PCT No.: PCT/US2017/038354
§ 371 (c)(1),
(2) Date: Jun. 5, 2018

(87) PCT Pub. No.: WO2018/236352
PCT Pub. Date: Dec. 27, 2018

(65) Prior Publication Data
US 2020/0270987 A1    Aug. 27, 2020

(51) Int. Cl.
*E21B 47/13*    (2012.01)
*G01V 3/28*    (2006.01)
*G01V 3/34*    (2006.01)
*G01V 11/00*    (2006.01)

(52) U.S. Cl.
CPC ............. *E21B 47/13* (2020.05); *G01V 3/28* (2013.01); *G01V 3/34* (2013.01); *G01V 11/002* (2013.01)

(58) Field of Classification Search
CPC . E21B 47/13; G01V 3/28; G01V 3/34; G01V 11/002
See application file for complete search history.

(56) References Cited

U.S. PATENT DOCUMENTS

| 4,215,427 | A | 7/1980 | Waggener et al. |
|---|---|---|---|
| 2004/0090234 | A1* | 5/2004 | Macune .............. G01V 3/30 324/337 |
| 2007/0046516 | A1* | 3/2007 | Dornbusch ............ H04L 27/12 341/143 |
| 2008/0252384 | A1* | 10/2008 | Chow ................. H03L 7/18 331/22 |
| 2009/0244691 | A1* | 10/2009 | Mueller ............ B23K 26/0676 359/307 |

(Continued)

FOREIGN PATENT DOCUMENTS

EP     0314654 B1    1/1992
WO    2016108885 A1    7/2016

*Primary Examiner* — Amine Benlagsir
(74) *Attorney, Agent, or Firm* — Benjamin Ford; Parker Justiss, P.C.

(57) ABSTRACT

A downhole system includes a first module having a transmitter that transmits at least one sync control signal. The system also includes a second module having a sync module with a direct digital synthesizer (DDS). The sync module analyzes the at least one sync control signal to identify at least one of a sync frequency and a sync phase. The DDS adjusts a local receiver clock based on the identified at least one of a sync frequency and a sync phase.

20 Claims, 8 Drawing Sheets

(56) References Cited

U.S. PATENT DOCUMENTS

| | | |
|---|---|---|
| 2011/0109310 A1 | 5/2011 | Hornung |
| 2013/0057411 A1* | 3/2013 | Bell ........................ E21B 47/10 340/853.3 |
| 2013/0066557 A1 | 3/2013 | Forgang |
| 2016/0006590 A1 | 1/2016 | Thursby et al. |
| 2017/0315263 A1 | 11/2017 | Griffing et al. |

* cited by examiner

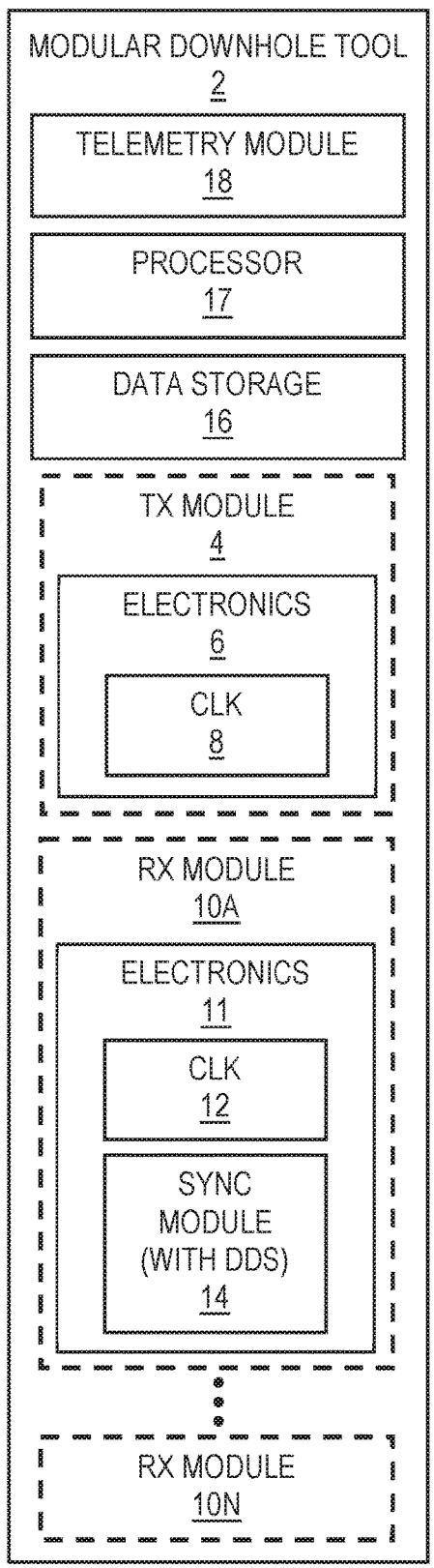
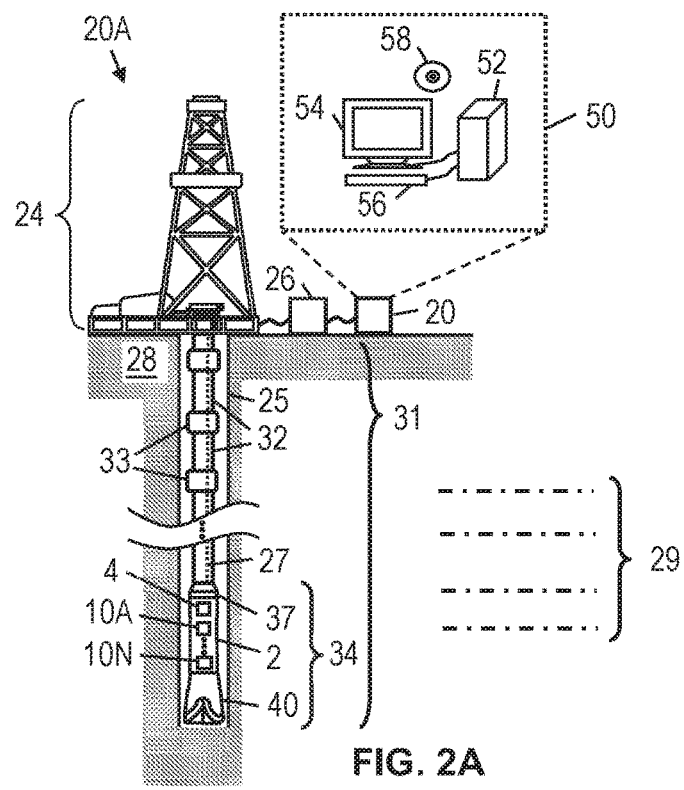
FIG. 2A
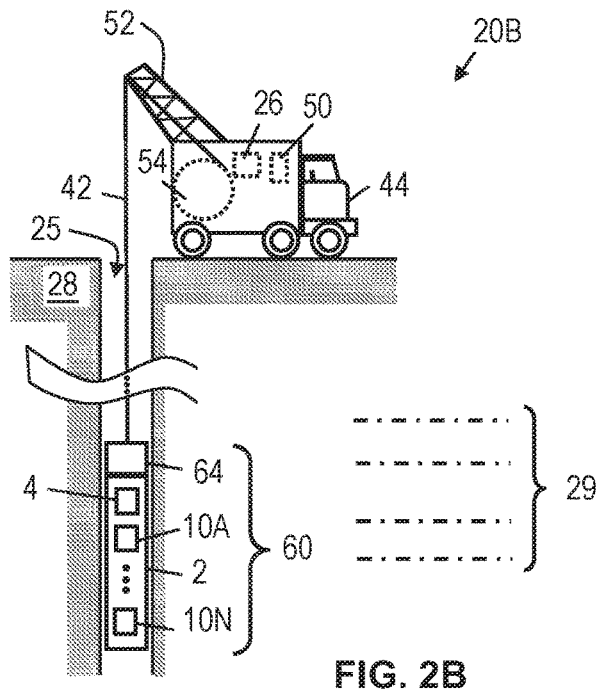
FIG. 2B
FIG. 1

METHODS AND SYSTEMS WITH DOWNHOLE SYNCHRONIZATION BASED ON A DIRECT DIGITAL SYNTHESIZER (DDS)

CROSS-REFERENCE TO RELATED APPLICATION

This application is the National Stage of, and therefore claims the benefit of, International Application No. PCT/US2017/038354 filed on Jun. 20, 2017, entitled "METHODS AND SYSTEMS WITH DOWNHOLE SYNCHRONIZATION BASED ON A DIRECT DIGITAL SYNTHESIZER (DDS)". The above application is commonly assigned with this National Stage application and is incorporated herein by reference in its entirety.

BACKGROUND

Modern petroleum drilling and production operations demand a great quantity of information relating to the parameters and conditions downhole. Such information typically includes the location and orientation of the wellbore and drilling assembly, earth formation properties, and drilling environment parameters downhole. The collection of information relating to formation properties and conditions downhole is commonly referred to as "logging."

Various logging tools exist for use in wireline logging and logging-while-drilling operations. One example logging tool is a resistivity logging tool, which includes one or more antennas for transmitting an electromagnetic signal into the formation and one or more antennas for receiving a formation response. When operated at low frequencies, resistivity logging tools may be referred to as "induction" tools. Meanwhile, when operated at high frequencies, resistivity logging tools may be referred to as electromagnetic wave propagation tools.

Some logging tools, including some resistivity logging tools, employ antennas connected to different electronic components (e.g., different clocks). When different electronics are used for different antennas, synchronization ensures communications or measurements are interpreted correctly. The synchronization issue is not trivial and varies for different logging tools and scenarios. A continuous synchronization signal is sometimes not possible (or is undesirable) due to the low bandwidth available downhole and the large amount of information that needs to be conveyed between or from downhole tools. Efforts to reduce the amount of synchronization needed between separated logging tool electronics are ongoing.

BRIEF DESCRIPTION OF THE DRAWINGS

Accordingly, there are disclosed in the drawings and the following description systems and methods with downhole synchronization based on a direct digital synthesizer (DDS). In the drawings:

FIG. 1 is a block diagram showing an illustrative modular downhole tool;

FIG. 2A is a schematic diagram showing an illustrative drilling environment;

FIG. 2B is a schematic diagram showing an illustrative wireline environment;

Figure 4C:
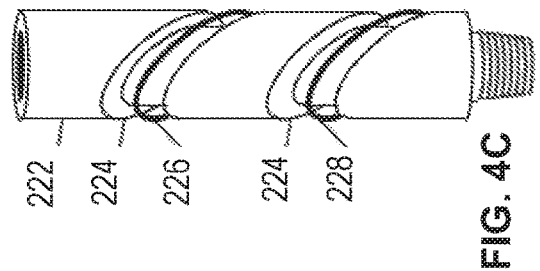
FIGS. 4A-4D are side views showing illustrative modular downhole tool subs.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical connection. Thus, if a first device couples to a second device, that connection may be through a direct electrical connection, or through an indirect electrical connection via other devices and connections. In addition, the term "attached" is intended to mean either an indirect or a direct physical connection. Thus, if a first device attaches to a second device, that connection may be through a direct physical connection, or through an indirect physical connection via other devices and connections.

DETAILED DESCRIPTION

Disclosed herein are systems and methods with downhole synchronization based on a direct digital synthesizer (DDS). The disclosed downhole synchronization techniques may be applied to different types of downhole logging tools that include separated electronics (e.g., different clocks). In at least some embodiments, the separated electronics correspond to at least one transmitter module and at least one receiver module that are within a single tool body. The single tool body can be used to house a single logging tool or multiple logging tools. Alternatively, the separated electronics may correspond to at least one transmitter module and at least one receiver module that are distributed across a plurality of tool bodies. The plurality of tool bodies may correspond to a single logging tool or multiple logging tools. In different embodiments, the plurality of tool bodies with distributed transmitter modules and/or receiver modules can be coupled to each other directly or indirectly. Also, the coupling of tool bodies can be rigid or flexible. For example, in a logging-while-drilling scenario, a rigid coupling between tool bodies is needed. Meanwhile, in a wireline logging scenario, a rigid or flexible coupling between tool bodies may be used. The coupling components between tool bodies with transmitter and/or receiver modules may be, for example, a wireline, an umbilical, a slickline, coiled tubing, metallic tubulars (drillstring or casing segments), wired tubulars, or other couplers. In one embodiment, transmitter and/or receiver modules are on opposite sides of a mud motor to facilitate near-bit or at-bit measurements.

In accordance with at least some embodiments, downhole synchronization involves a transmitter module that transmits at least one sync control signal to a receiver module having a sync module with a DDS. The sync module operates to identify at least one of a sync frequency and a sync phase from the at least one sync control signal. Thereafter, the DDS operates to adjust local receiver clock operations based on the identified at least one of a sync frequency and a sync phase. Using the DDS for local receiver clock adjustments ensures high resolution adjustments such that synchronizations do not need to be performed as frequently (compared to lower resolution adjustments). This reduction in the number of synchronizations needed is advantageous in a downhole environment, where limited bandwidth telemetry channels are used to convey data, communications, and sync control signals. By limiting the number of synchronizations needed, the limited bandwidth telemetry channels available downhole can convey more data and communications.

In at least some embodiments, an example system with downhole synchronization includes a first module having a transmitter that transmits at least one sync control signal. The system also includes a second module having a sync module with a DDS. The sync module analyzes the at least one sync control signal to identify at least one of a sync frequency and a sync phase, and wherein the DDS adjusts a local receiver clock based on the identified at least one of a sync frequency and a sync phase. Meanwhile, an example system with downhole synchronization includes transmitting at least one sync control signal from a first downhole module to a second downhole module. The method also includes analyzing the at least one sync control signal at the second downhole module to identify at least one of a sync frequency and a sync phase. The method also includes using a DDS to adjust a local receiver clock of the second downhole module based on the identified at least one of a sync frequency and a sync phase. Various embodiments for downhole synchronization using a DDS are described herein.

In accordance with at least some embodiments, using a DDS as described herein enables independent control of frequency and phase. For example, a phase accumulator register and a phase shift register may be used for this purpose. After the DDS frequency is adjusted and locked with the transmitter frequency, only phase adjustment is needed before the next acquisition (e.g., a transfer of tool measurements from a transmitter to a receiver). For example, the next acquisition may involve receiving a start acquisition sequence from the transmitter, where the start acquisition sequence includes a sync pulse. The sync pulse is used to calculate and adjust the DDS phase, and thereafter the DDS adjusts a local receiver clock phase. Independent phase or frequency adjustments performed by a DDS can be applied periodically and/or when interference is detected. For example, for some acquisitions a DDS can adjust phase of a local receiver clock without adjusting frequency of the local receiver clock. Meanwhile, for other acquisitions, a DDS can adjust frequency of a local receiver clock without adjusting phase of the local receiver clock. By comparison, phase adjustment for a voltage-controlled oscillator (VCO) (an alternative to the disclosed DDS embodiments) would involve changing VCO frequency for a time to adjust phase and then changing the frequency back. This is true even with equal reference and VCO frequencies.

The disclosed methods and systems are best understood when described in an illustrative usage context. FIG. 1 is a block diagram showing an illustrative modular downhole tool 2. The modular downhole tool 2 corresponds to a resistivity logging tool or other known logging tool. As shown, the modular downhole tool 2 includes a transmitter (TX) module 4 with electronics 6 that operate using a clock 8. The modular downhole tool 2 also includes a receiver (RX) module 10A spaced (e.g., at least axially-spaced) from the TX module 4, where the RX module 10A includes electronics 11 that operate using another clock 12. The RX module 10A also includes a sync module 14 with a DDS. In at least some embodiments, the modular downhole tool 2 includes RX module 10N to represent that the modular downhole tool 2 can include a plurality of RX modules 10A-10N, where each of the RX modules 10A-10N may include similar components (e.g., electronics 11, a clock 12, and a sync module 14). In at least some embodiments, the RX modules 10A-10N are spaced from the TX module 4 and from each other to enable analysis of a received signal that travels through different portions and/or different depths of the downhole formation. In addition, the modular downhole tool 2 of FIG. 1 is shown to include data storage 16, a processor 17, and a telemetry module 18.

In operation, the modular logging tool 2 uses the TX module 4 and the RX modules 10A-10N to obtain measurements indicative of downhole formation parameters. For example, TX module 4 may transmit an electromagnetic signal having a known frequency and phase. The transmitted signal will travel through the downhole formation and will be received at each of the RX modules 10A-10N (assuming attenuation and noise do not prevent signal analysis). In response to the transmitted signal, a receive signal is obtained at each of the RX modules 10A-10N. The receive signals are digitized and stored, for example, by data storage 16. The processor 17 is able to access the stored signals and analyze the signal parameters (e.g., frequency, amplitude, phase). For example, the parameters of received signals can be compared with the parameters of the original transmitted signal and/or compared with the parameters of other received signals by the processor 17. In some embodiments, the ratios of the received signals or the differences between the received signals can be used in the analysis.

To ensure accuracy of any comparison between different signals corresponding to the TX module 4 or the RX modules 10A-10N, the respective clocks (e.g., clock 8 and clock 12) need to be synchronized. Accordingly, the TX module 4 is configured to provide at least one sync control signal to each of the RX modules 10A-10N to enable synchronization. The at least one sync control signal can be transmitted periodically (e.g., according to a predetermined schedule) and/or can be transmitted in response to predetermined downhole sync criteria. In different embodiments, the predetermined downhole sync criteria can account for electronic components being used, laboratory test results, and/or real-time measurements of ambient parameters (e.g., temperature variations). The sync module 14 is configured to analyze the at least one sync control signal to identify a sync frequency and a sync phase. The sync control signal analysis can be performed in different ways as described herein. Once the sync frequency and the sync phase are identified, a DDS component of each sync module 14 is used to adjust a local receiver clock. The synchronization of the local receiver clocks (not shown) ensures accuracy when then processor 17 analyzes the receive signals (e.g., by comparing parameters of a received signal with the parameters of a corresponding transmitted signal and/or the parameters of at least one other received signal).

The result of the analysis performed by the processor 17 may be one-dimensional (1D), two-dimensional (2D), and/or three-dimensional (3D) formation parameter values that vary as a function of the position of the modular downhole tool 2 in a borehole. For example, the processor 17 may output formation parameter values as a function of depth (i.e., 1D data), formation parameter values as a function of depth and azimuthal angle (i.e., 2D data), and/or formation parameter values as a function of depth, azimuthal angle, and radial distance from the borehole (i.e., 3D data). At least some of the formation parameter values can be provided to the telemetry module 18, which conveys these values to earth's surface and/or to other downhole tools via an available telemetry channel compatible with the telemetry module 18. Example telemetry techniques include mud pulse telemetry, acoustic telemetry, electromagnetic telemetry (wired or wireless), or other known telemetry options. At earth's surface, the formation parameter values (or related logs or images) may be displayed using a display device (e.g., a computer or printer). The displayed values or images are analyzed with or without involvement of a user. Additionally or alternatively, the formation parameter values may be conveyed from the telemetry module 18 to another downhole tool configured to analyze the formation parameter values and/or to perform one or more downhole operations in response to the formation parameter values or commands derived therefrom. Regardless of whether the downhole formation parameters are analyzed downhole or at earth's surface, various operations such as directional drilling operations, perforating operations and/or other well completion operations, fluid flow control operations, and/or well intervention operations can be performed in response to the downhole formation parameters or commands derived therefrom.

In different embodiments, the TX module 4 and the RX modules 10A-10N of the modular downhole tool 2 are within a single tool body corresponding to one or more logging tools. Alternatively, the TX module 4 and the RX modules 10A-10N of the modular downhole tool 2 are distributed across a plurality of tool bodies. The plurality of tool bodies may correspond to a single logging tool or multiple logging tools that share some components. In different embodiments, the plurality of tool bodies with distributed TX modules and/or RX modules can be coupled to each other directly or indirectly. Also, the coupling of tool bodies can be rigid or flexible. For example, in a logging-while-drilling scenario, a rigid coupling between tool bodies is needed. Meanwhile, in a wireline logging scenario, a rigid or flexible coupling between tool bodies may be used. The coupling components between tool bodies with transmitter and/or receiver modules may be, for example, a wireline, an umbilical, a slickline, coiled tubing, metallic tubulars (drill-string or casing segments), wired tubulars, or other couplers. In one embodiment, the TX module 4 and/or certain ones of the RX modules 10A-10N are on opposite sides of a mud motor to facilitate near-bit or at-bit measurements.

FIG. 2A is a schematic diagram showing an illustrative drilling environment 20A that may include a modular logging tool 2. In FIG. 2A, a drilling assembly 24 enables a drill string 31 to be lowered and raised in a borehole 25 that penetrates formations 29 of the earth 28. The drill string 31 is formed, for example, from a modular set of drill string segments 32 and adaptors 33. At the lower end of the drill string 31, a bottomhole assembly 34 with a drill bit 40 removes material from the formations 29 using known drilling techniques. The bottomhole assembly 34 also includes one or more drill collars 37 and a modular downhole tool 2. As previously described with respect to FIG. 1, the modular downhole tool 2 includes a TX module 4 and one or more RX modules 10A-10N, where each of the RX modules 10A-10N includes a sync module 14 with a DDS as described herein.

In accordance with at least some embodiments, measurements obtained by the modular downhole tool 2 are analyzed and downhole formation parameters derived from the measurements are conveyed to earth's surface using known telemetry techniques (e.g., wired pipe telemetry, mud pulse telemetry, acoustic telemetry, electromagnetic telemetry) and/or are stored by the modular downhole tool 2. In at least some embodiments, a cable 27 may extend from the BHA 34 to earth's surface. For example, the cable 27 may take different forms such as embedded electrical conductors and/or optical waveguides (e.g., fibers) to enable transfer of power and/or communications between the bottomhole assembly 34 and earth's surface. In different embodiments, the cable 27 may be integrated with, attached to, or inside the modular components of the drill string 31.

In FIG. 2A, an interface 26 at earth's surface receives downhole formation parameters and/or related measurements via cable 27 or another telemetry channel and conveys the downhole formation parameters and/or related measurements to a computer system 50. In some embodiments, the surface interface 26 and/or the computer system 50 may perform various operations such as converting signals from one format to another and storing downhole formation parameters and/or related measurements. The computer system 50 also may operate to analyze downhole formation parameters and/or related measurements to provide logs, images, or updated downhole formation models. Directional drilling operations and/or other downhole operations (e.g., fluid flow control, pressure control, valve position adjustment, logging tool updates) can be updated based on analysis of the downhole formation parameters and/or related measurements. In different embodiments, a user can interact with the computer system 50 to select analysis or response options (e.g., logs, images, direction drilling updates, downhole operation updates). Additionally or alternatively, analysis or response options are automated (e.g., based on predetermined rules).

In at least some embodiments, the computer system 50 includes a processing unit 52 that performs analysis or response operations by executing software or instructions obtained from a local or remote non-transitory computer-readable medium 58. The computer system 50 also may include input device(s) 56 (e.g., a keyboard, mouse, touchpad, etc.) and output device(s) 54 (e.g., a monitor, printer, etc.). Such input device(s) 56 and/or output device(s) 54 provide a user interface that enables an operator to interact with the modular downhole tool 2 and/or software executed by the processing unit 52. For example, the computer system 50 may enable an operator to select logging options, to select analysis options, to view obtained measurements, to view downhole formation properties (e.g., logs or images) obtained from the measurements, to adjust directional drilling, to adjust downhole operations, and/or to perform other tasks. Further, information about the downhole position at which measurements are obtained may be taken into account and used to facilitate well completion decisions and/or other strategic decisions related to producing hydrocarbons.

At various times during the drilling process, the drill string 31 shown in FIG. 2A may be removed from the borehole 25. With the drill string 31 removed, another option for deployed a modular downhole tool 2 involves the wireline environment 20B of FIG. 2B. In FIG. 2B, a wireline tool string 60 is suspended in a borehole 25 that penetrates formations 29 of the earth 28. For example, the wireline tool string 60 may be suspended by a cable 42 having conductors and/or optical fibers for conveying power to the wireline tool string 60. The cable 42 may also be used as a communication interface for uphole and/or downhole communications. In at least some embodiments, the cable 42 wraps and unwraps as needed around cable reel 54 when lowering or raising the wireline tool string 60. As shown, the cable reel 54 may be part of a movable logging facility or vehicle 42 having a cable guide 52.

In at least some embodiments, the wireline tool string 60 includes modular downhole tool 2. As previously described with respect to FIG. 1, the modular downhole tool 2 includes a TX module 4 and one or more RX modules 10A-10N, where each of the RX modules 10A-10N includes a sync module 14 with a DDS as described herein. The wireline tool string 60 may also include other tools or electronics 64. The measurements collected by the modular downhole tool 2 are conveyed to earth's surface and/or are stored by the wireline tool string 60. In either case, the measurements can be analyzed to obtain downhole formation parameters.

At earth's surface, a surface interface 26 receives the downhole formation parameters and/or related measurements via the cable 42 and conveys the downhole formation parameters and/or related measurements to a computer system 50. As previously discussed, the interface 26 and/or computer system 50 (e.g., part of the movable logging facility or vehicle 44) may perform various operations such as converting signals from one format to another and storing downhole formation parameters and/or related measurements. The computer system 50 also may operate to analyze downhole formation parameters and/or related measurements to provide logs, images, or updated downhole formation models. As an example, the obtained downhole formation parameters may correspond to formation resistivity or conductivity as a function of tool depth, azimuthal angle, and/or radial distance to the borehole 25.

Figure 3:
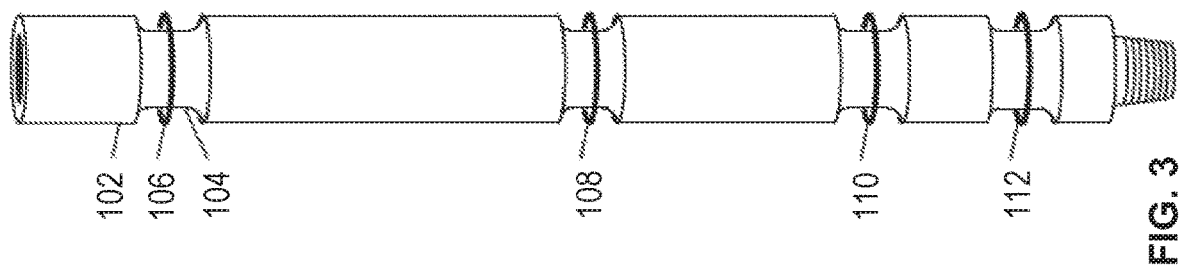
FIG. 3 is a side view showing an illustrative modular downhole tool.

FIG. 3 is a side view showing an illustrative modular downhole tool 2. As shown in FIG. 3, the modular downhole tool 2 may have a tool body 102 with one or more recessed regions 104. In FIG. 3, there are four recessed regions 104, each with a respective coaxial antenna 106, 108, 110, and 112. The coaxial antennas 106, 108, 110, and 112 may be insulated from the tool body 102 and/or surrounded by a protective material (not shown). Example protective materials include epoxy, rubber, fiberglass, or ceramics. In such case, the recessed region 104 may be filled or partially filled with the protective material. In different embodiments, the coaxial antennas 106, 108, 110, and 112, may each have one or more loops of wire and may correspond to transmitters or receivers with separate electronics.

In one embodiment, coaxial antennas 106 and 108 are part of separate TX modules, while coaxial antennas 110 and 112 are part of separate RX modules. In operation, coaxial antenna 106 transmits an electromagnetic signal that propagates through a borehole space and into the surrounding formation. At coaxial antennas 110 and 112, a signal voltage is measured to determine an amplitude attenuation and/or a phase shift between coaxial antennas 110 and 112. The measurement is repeated using coaxial antenna 108 as a transmitter. From the measured attenuation and/or phase shifts, the resistivity of the formation can be estimated.

The modular downhole tool embodiment of FIG. 3 lacks azimuthal sensitivity, making it difficult to determine the direction of any approaching bed boundaries. To provide azimuthal sensitivity, one or more of the antennas 106, 108, 110, and 112 could be tilted. (different orientations for transmitter and receiver antennas provide azimuthal sensitivity). Also, different transmitter/receiver spacings and/or different frequencies for the transmitted signal enable multiple depths of investigation (i.e., radial distance to borehole sensitivity).

FIGS. 4A-4D are side views showing illustrative modular downhole tool subs (attachments). The modular downhole tool subs can be coupled to each other and/or to another tool body (e.g., tool body 102 of FIG. 3) to provide different antenna options for a modular downhole tool 2. In some embodiments, modular downhole tool subs with antennas are separated from each other by other types of subs (e.g., other logging tools, spacers, etc.).

The subs of FIGS. 4A-4D include a coupling mechanism that enables each sub to be coupled to other subs. In some embodiments, the coupling mechanism may be a threaded pin and box mechanism as shown in FIG. 3 and FIGS. 4A-4D. In other embodiments, the coupling mechanism may be a screw-on mechanism, a press-fit mechanism, a weld, or some other coupling means that allows subs to be assembled together with controlled azimuthal alignments.

Figure 4D:
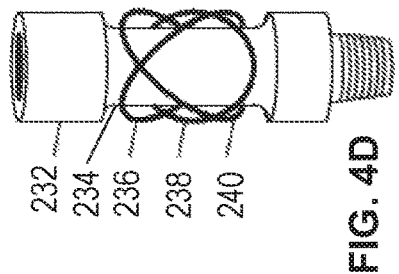
Figure 4A:
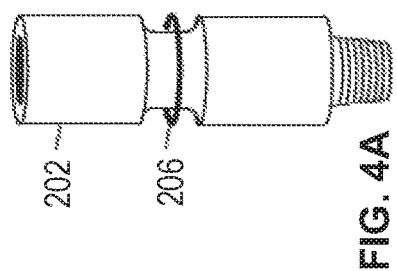
Figure 4B:
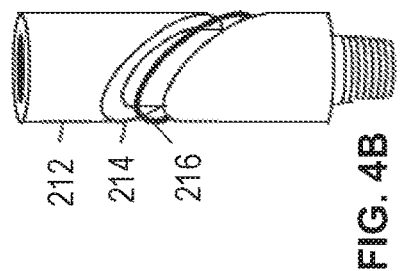

In FIG. 4A, an example modular downhole tool sub includes a tool body 202 with a single coaxial antenna 206. In FIG. 4B, another example modular downhole tool sub includes a tool body 212 with a tilted antenna 216 in a tilted recessed region 214. In FIG. 4C, another example modular downhole tool sub includes a tool body 222 with two tilted antennas 226 and 228 in respective tilted recessed regions 214. In FIG. 4D, another example modular downhole tool sub includes a tool body 232 with triaxial antenna components 236, 238, and 240 in a recessed region 234.

In FIGS. 4A-4D, the different antennas represented may be insulated from the respective tool bodies and/or surrounded by a protective material (not shown). Example protective materials include epoxy, rubber, fiberglass, or ceramics. Also, each recessed region may be filled or partially filled with the protective material. In different embodiments, the different antennas represented may each have one or more loops of wire and may correspond to transmitters or receivers (e.g., each attachment example may correspond to one TX or RX module). In some embodiments, sub tool bodies do not include a recessed region. In such case, any antennas are external to the tool body and may be protected wound on a non-recessed segment of the tubular if desired, perhaps between protective wear bands.

In accordance with at least some embodiments, each sub included with a modular downhole tool 2 may be provided with electronics that allow each antenna to operate as a transmitter or receiver. In some embodiments, a one-line power and communications bus (with the tool body acting as the ground) is provided to convey power, communications, and sync control signals between subs.

Figure 5:
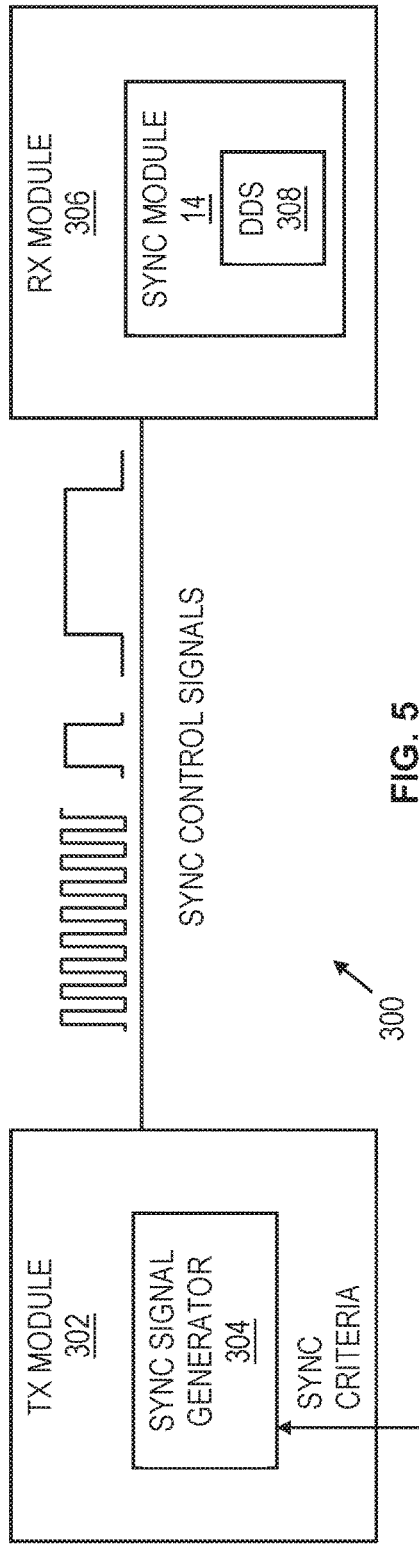
FIG. 5 is a block diagram showing components of an illustrative downhole system with synchronization based on a DDS.

FIG. 5 is a block diagram showing components of an illustrative downhole system 300 with synchronization based on a DDS. As shown, the system 300 includes a TX module 302 with a sync signal generator 304. The system 300 also includes an RX module 306 having a sync module 14 with a DDS 308. The TX module 302 and the RX module 306 may be part of a modular downhole tool 2 (see e.g., FIG. 1, FIG. 2A, FIG. 2B). For example, the TX module 302 may correspond to the TX module 4 of FIG. 1, and the RX module 306 may correspond to one of the RX modules 10A-10N of FIG. 1. In one embodiment, the TX module 302 and the RX module 306 are part of one modular downhole tool sub (see e.g., FIGS. 3 and 4A-4D). In another embodiment, the TX module 302 and the RX module 306 are distributed to different modular downhole tool subs that are directly or indirectly coupled together.

In operation, the TX module 302 transmits logging tool signals or modulated data to the RX module 306 via wired and/or wireless transmission. To ensure accuracy of logging tool measurements or to facilitate recovery of modulated data, the sync signal generator 304 of the TX module 302 periodically transmits at least one sync control signal to the RX module 306. In different embodiments, the at least one sync control signal can be conveyed via wired or wireless transmission to the RX module 306. The timing for transmitting the at least one sync control signal may vary according to predetermined sync criteria established for the system 300. In at least some embodiments, the predetermined sync criteria may account for clock drift of components, temperature changes, lab test results, etc. The at least one sync control signal is carried, for example, via a one-line power and communications bus that connects to modules of one sub and/or to modules of different subs. In some embodiments, the at least one sync control signal comprises a sync clock that provides a sync frequency and a sync phase. Additionally or alternatively, one or more sync pulses with predetermined widths can be used to provide a sync frequency and/or a sync phase. Sync pulses can be sent together (one after the other) or can be separated in time. In some embodiments, a first sync pulse with a first duration provides a sync frequency and a second sync pulse with a second duration (different than the first duration) provides a sync phase (e.g., the second sync pulse may be a start signal) that is recognized by the RX module 14.

In response to receiving at least one sync control signal from the TX module 302, the sync module 14 of the RX module 306 identifies a sync frequency and a sync phase. The sync module 14 then directs its DDS 308 to adjust a local receiver clock based on the identified sync frequency and sync phase. In at least some embodiments, the DDS 308 may also provide a control signal to a phase detector that tracks phase error as described herein.

Figure 6:
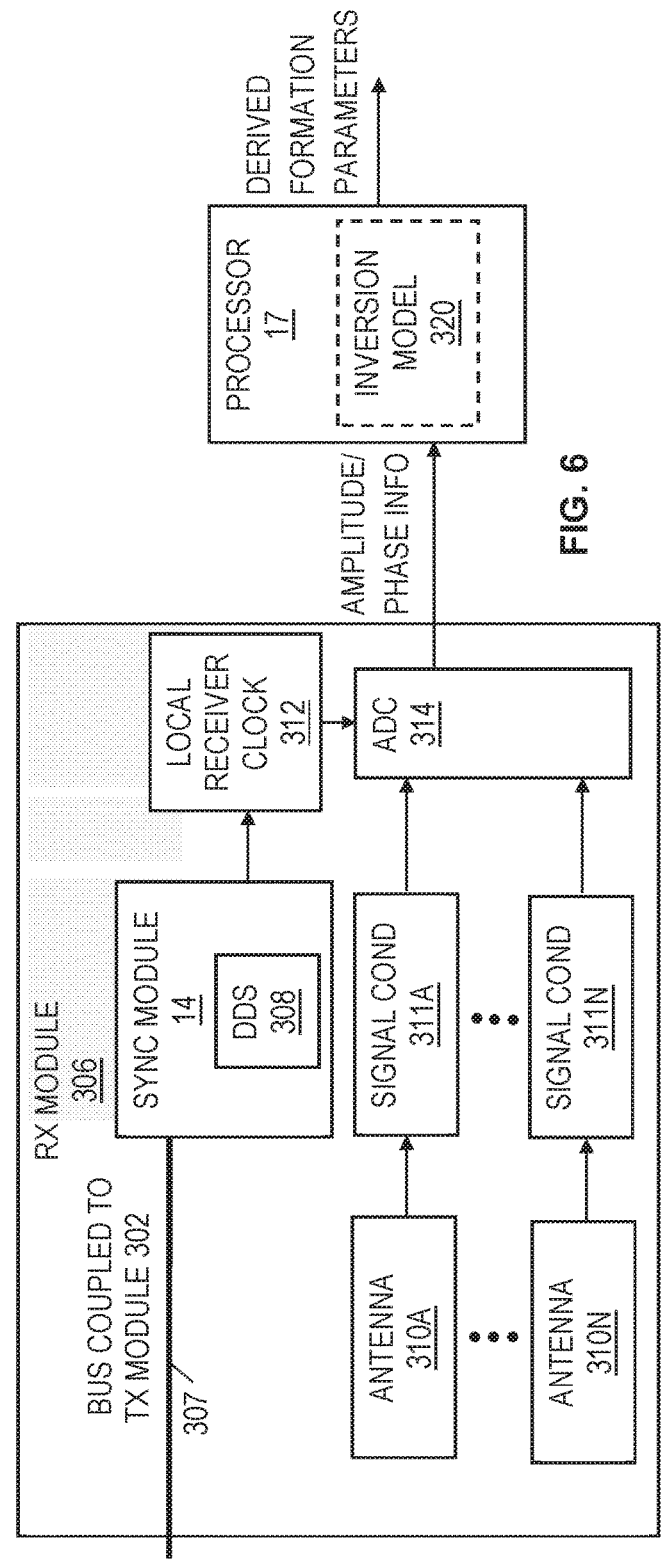
FIG. 6 is another block diagram showing components of an illustrative downhole system.

FIG. 6 is another block diagram showing components of an illustrative modular downhole tool. In FIG. 6, some additional components of the RX module 306 are represented. For example, the RX module 306 of FIG. 6 includes a bus 307 coupled to the TX module 302. The bus 307 can be used for communications and syncing between modules. The bus 307 couples to the sync module 14, which identifies a sync frequency and a sync phase as described herein. The RX module 306 also includes one or a plurality of antennas 310A-310N that can be used for communication, collecting logging measurements, and/or syncing between modules. The output of each antenna 310A-310N may be provided to a respective signal conditioner module 311A-311N to amplify, filter, or otherwise condition signals from each antenna 310A-310N for use by the analog-to-digital converter (ADC) 314 or other components of the RX module 306. The DDS 308 of the sync module 14 adjusts a local receiver clock 312 that is used by the ADC 314 and/or other components of the RX module 306. As an example, the ADC 314 uses the local receiver clock to sample logging tool measurements obtained by one or more of the antennas 310A-310N at a particular sampling rate. The digitized measurement samples include amplitude and/or phase information that is provided to the processor 17. The processor 17, or a memory in communication with the processor 17, includes an inversion model 320 that is used to derive formation parameters from the amplitude and/or phase information corresponding to the digitized measurements. Also, the known amplitude and/or phase information for the original signal transmitted by TX module may be used by the inversion model 320. As an example, the derived formation parameters may correspond to formation resistivity or conductivity as a function of tool depth, azimuthal angle, and/or radial distance to the borehole. The formation parameters can be conveyed to earth's surface and displayed to a user (e.g., a log or image) as described herein. The user may use the displayed information to select directional drilling options, surface operations, and/or downhole operations (e.g., well planning operations, well completion operations, etc.). Additionally or alternatively, the derived formation parameters can be provided to downhole tools configured to perform operations (e.g., valve control, perforator control, screen control, etc.) based on the derived formation parameters.

Figure 7A:
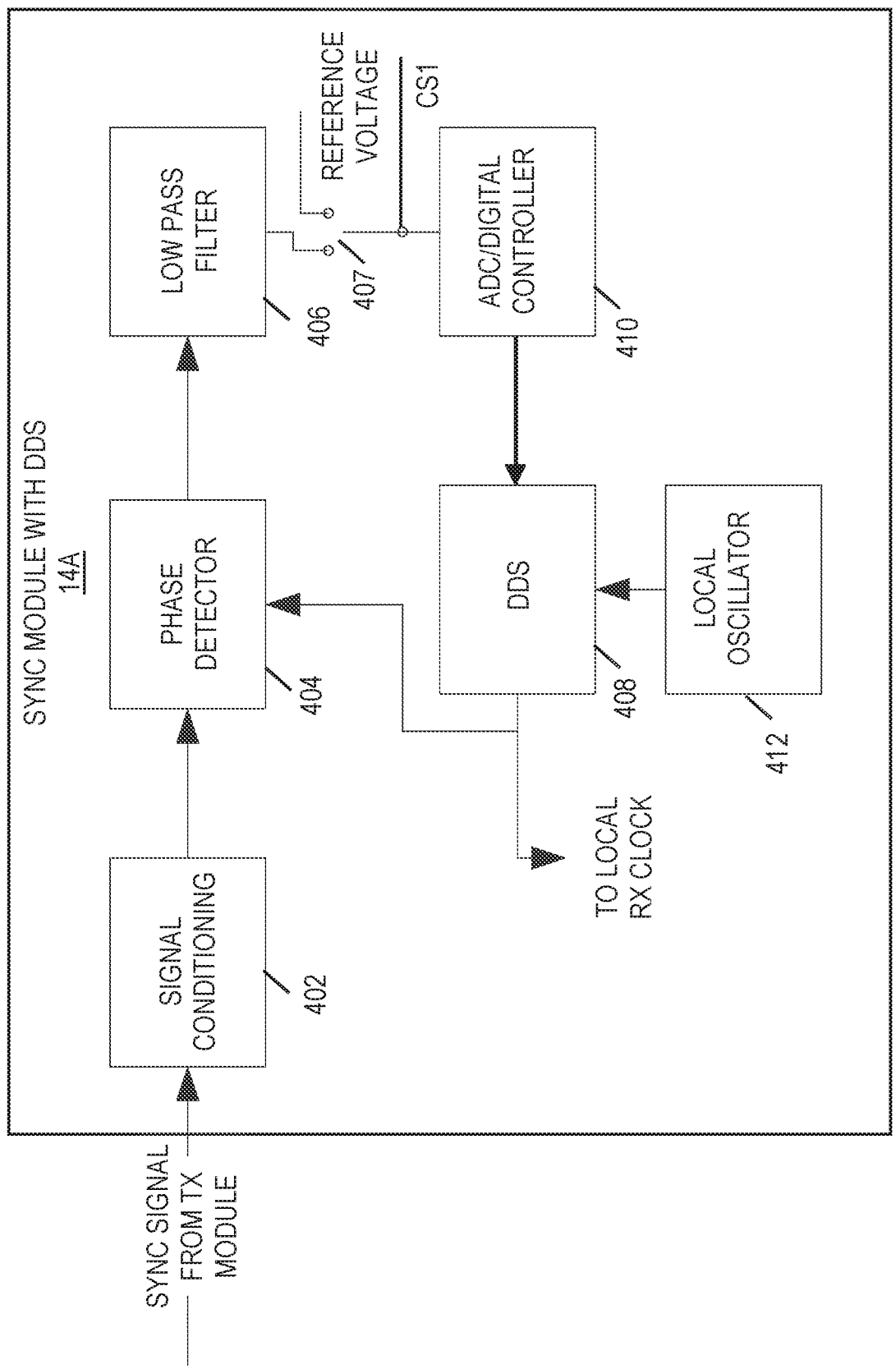
FIGS. 7A-7C are block diagrams showing components of illustrative sync modules having a DDS.
Figure 7B:
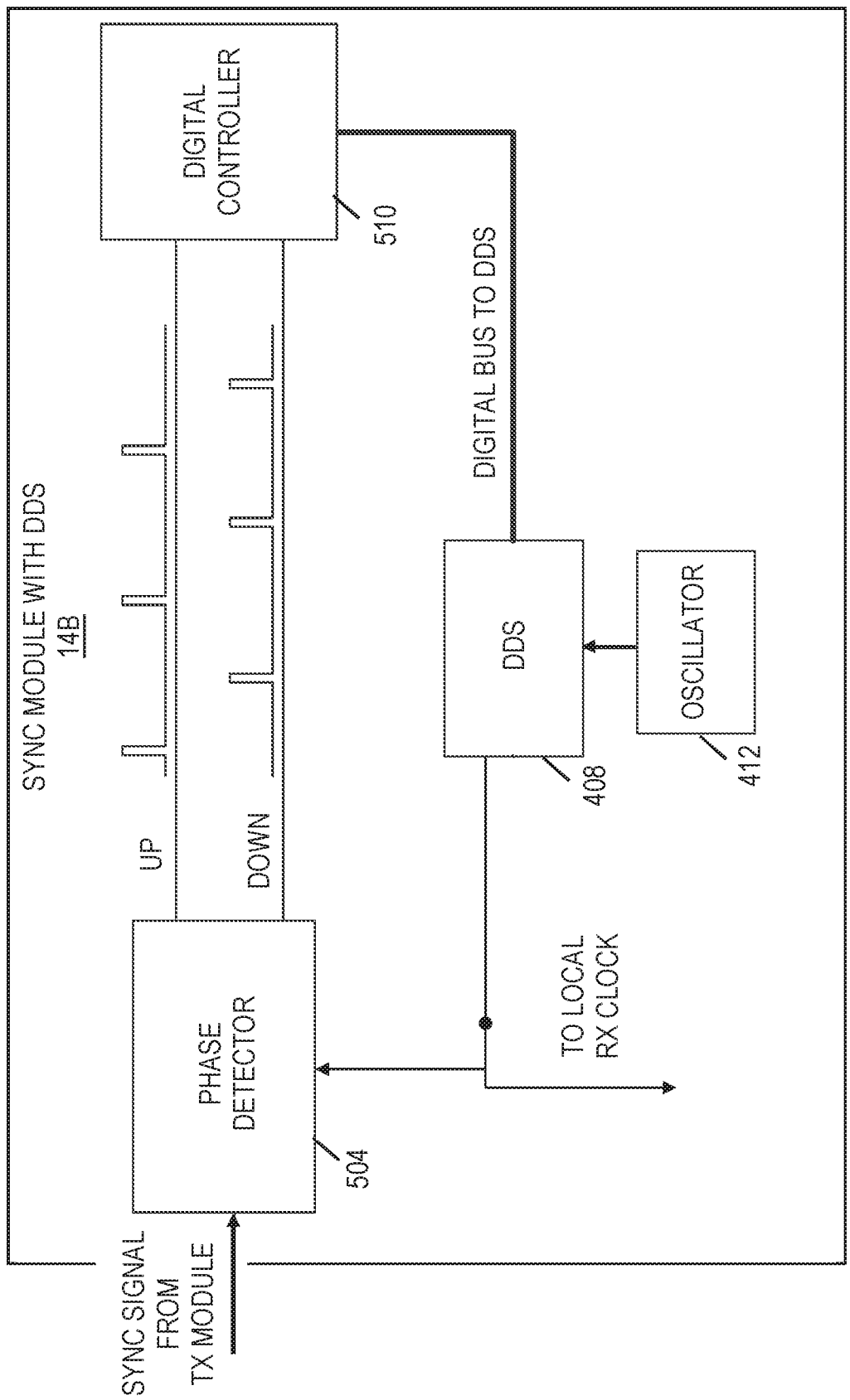
Figure 7C:
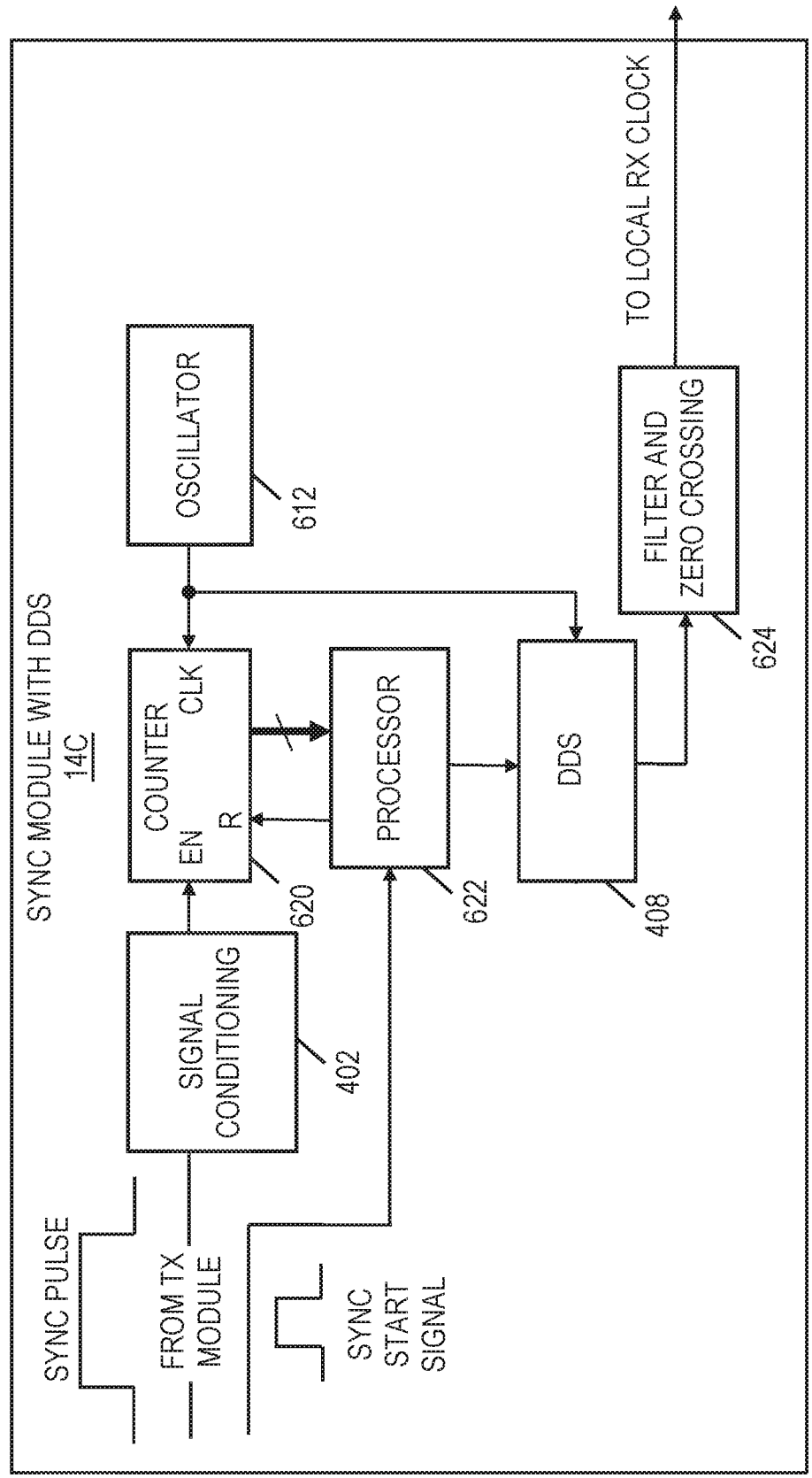

FIGS. 7A-7C are block diagrams showing components of illustrative sync modules 14A-14C, each having a DDS 408. In the configuration of FIG. 7A, the sync module 14A comprises a signal conditioning block 402 that cleans up the sync signal received from the TX module (e.g., removing spikes or otherwise smoothing the signal). The output from the signal conditioning block 402 is provided to a phase detector 404, which determines the error between a reference phase provided by the DDS 408 and the phase of the received sync signal. The output of the phase detector 404 is provided to a low pass filter 406, which accumulates the phase error over time. The output of the low pass filter 406 is provided to an ADC and digital controller 410 via a switch 407, which may be used to provide a reference voltage/signal to the ADC/digital controller 410. While the ADC/digital controller 410 are shown as one component in FIG. 7A, their functions could be performed by multiple components in communication with each other. Also, as shown in FIG. 7A, the switch 407 either connects the output of the low pass filter 406 or the reference voltage/signal to the ADC/digital controller 410 in accordance with a control signal (CS1). The reference voltage/signal in FIG. 7A may be used for self-test and/or self-calibration of the ADC/digital controller 410 and/or other components of the sync module 14A. The offset and/or thermal drift could be measured/calibrated at pre-determined time intervals and/or temperature changes based on the measured/known system performance. The reference voltage/signal switch could also be moved before the low pass filter 406, before the phase detector 404, and/or before the signal conditioning block 402 to capture the offset/thermal drift of those components as well.

The digital controller 410 provides a control signal to the DDS 408 based on the accumulated error. The DDS 408 also receives an input signal from a local oscillator (LO) 412. Based on the control signal from the digital controller 410 and the input signal from the local oscillator 412, the DDS 408 provides a clock with a reference phase to the phase detector 404 and to a local receiver clock (e.g., local receiver clock 312). In at least some embodiments, the local oscillator 412 has a drift rate or stability that is below a certain threshold. As an example, a Temperature Compensated Oscillator (TCXO) could be used, which are commercially available with stability of 1 ppm up to 125° C. A Microcontroller Compensated Oscillator (MCXO) is another option, which commercially can achieve stability in the tens of ppb up to 105° C.

For the sync module 14A FIG. 7A, the phase detector 404 outputs an analog signal to indicate phase error. In other embodiments, a phase detector may output a digital signal to indicate phase error. With a digital phase error loop, the drift associated with analog components (e.g., the low pass filter 406 and ADC) can be alleviated. Another option is to combine the functionality of the phase detector 404 and the DDS 408 (e.g., using a field-programmable gate array or "FPGA"). Yet another option is to provide an ADC that can be self-calibrated to further reduce the thermal drift (the switch 407 between the low pass filter 406 and the ADC/digital controller 410 in FIG. 7A could be used to place a known reference voltage/signal at the input). The reference voltage/signal switch could also be moved before the low pass filter 406, before the phase detector 404, or before the signal conditioning block 402 to capture the offset/thermal drift of those components as well.

As previously mentioned, the sync module configuration of FIG. 7A uses a phase detector 404 that provides an analog output to indicate phase error. In contrast, the sync module configuration of FIG. 7B uses a phase detector 504 that provides at least one digital signal to indicate phase error. For example, in the embodiment of FIG. 7B, 2 separate Up/Down digital signals are output from the phase detector 504 (more outputs can be used depending on the desired complexity and control capabilities. A pulse on the Up line indicates the phase and/or Frequency needs to be increased, conversely a pulse on the Down line indicates the Phase and/or Frequency needs to be decreased. In steady state, one would expect small pulses alternating on the Up and Down lines.

With the sync module configuration of FIG. 7B, low pass filtering and ADC operations are omitted which helps to alleviate drift caused by use of analog components. The digital signals output from the phase detector 504 are received by a digital controller 510 (e.g., a MicroProcessor/MicroController, FPGA, complex programmable logic device or "CPLD", etc.), which identifies a sync frequency and a sync phase based on the received digital signals. In at least some embodiments, the digital controller 510 identifies a sync frequency and a sync phase by applying digital filtering and a control algorithm.

In an example embodiment, the digital controller 510, based on the frequency/width of the pulses captured from the phase detector 504, uses a control algorithm to determine the degree of frequency/phase error between the Tx Sync Clock and the Local Rx Clock, and to predict the magnitude of the frequency/phase adjustment required for the DDS 408. (The control algorithm may be predetermined based on the performance requirements/characterization of the system/sync module.) The digital controller 510 then writes the new settings to the DDS 408 or related digital bus, and the control loop would repeat until the error is within an acceptable tolerance/threshold. This scheme can be implemented, for example, using a field programmable gate array (FPGA), or other programmable digital logic, to prevent delays in the control loop. The FPGA or other logic may be coupled to and communicate sync status to the system processor responsible for the other tool functions, such as sampling ADCs or receiver antennas.

Based on the identified sync frequency and sync phase, the digital controller 510 adjusts the DDS 408. For example, a multi-bit control signal may be provided to the DDS 408 via a bus that couples the digital controller 510 to the DDS 408. The DDS 408 also receives an oscillation input signal from oscillator 412. Based on the control signal from the digital controller 510 and the oscillation signal from the oscillator 412, the DDS 408 provides reference signals to the phase detector 504 and to a local receiver clock (e.g., local receiver clock 312).

In the configuration of FIG. 7C, the sync module 14C comprises a signal conditioning block 402 that cleans up sync signals received from the TX module (e.g., removing spikes or otherwise smoothing the sync signal). In FIG. 7C, the output from the signal conditioning block 402 is provided to a counter 620 that determines the duration/width of the sync pulse (i.e., the number of clock counts recorded by the counter corresponding to the pulse duration). In at least some embodiments, the counter 620 receives an input clock signal from an oscillator 612 for use with performing counts. The output of the counter 620 is provided to a processor 622, which identifies a sync frequency from the count information (e.g., a multi-bit value). As desired, the processor 622 may provide a reset signal to the counter 620. For example, the counter 620 can be reset whenever the counter 620 provides new count information to the processor 622.

In at least some embodiments, the processor 622 receives multiple sync pulses from the TX module. For example, a first sync pulse may provide sync frequency information and a second sync pulse (e.g., a start signal) may provide sync phase information. In response to receiving the multiple sync signals and/or corresponding information (e.g., the number of counts related to their respective pulse durations), the processor 622 provides a control signal to DDS 408. The DDS 408 also receives an oscillation signal from oscillator 612. The output of the DDS 408 is provided to a filter and zero crossing block 624, which changes a sinusoidal output from the DDS 408 to a square wave. The output of the filter and zero crossing block 624 is used, for example, as a reference signal for the local receiver clock. Note: the filter and zero crossing block 624 can also be included with the configurations of FIGS. 7A and 7B.

With the configuration of FIG. 7C, the accuracy of the DDS 408 can allow for a direct measurement and calibration of the oscillator frequency offset between 2 or more downhole modular tool subs without the need of a complex phase-locked loop (PLL) control. Instead of using PPLs, a TX module and related RX modules use counters to count the cycles of their local oscillators (LOs) during a long period signified by a long pulse sent out by the TX module. Afterwards, the number of cycles is compared between the TX modules and related RX modules. The RX modules use a DDS (e.g., DDS 408) to adjust the frequency of the local receiver clock to match the local clock of the TX module. The TX module then sends a start signal to initiate the DDS of related RX modules at a known phase sync. To eliminate jitter, the output of the DDS is sinusoidal and is converted to a square wave using the filter and zero crossing block 624. The output of the filter and zero crossing block 624 is a reference signal that can adjust a local receiver clock (e.g., local receiver clock 312).

Figure 8:
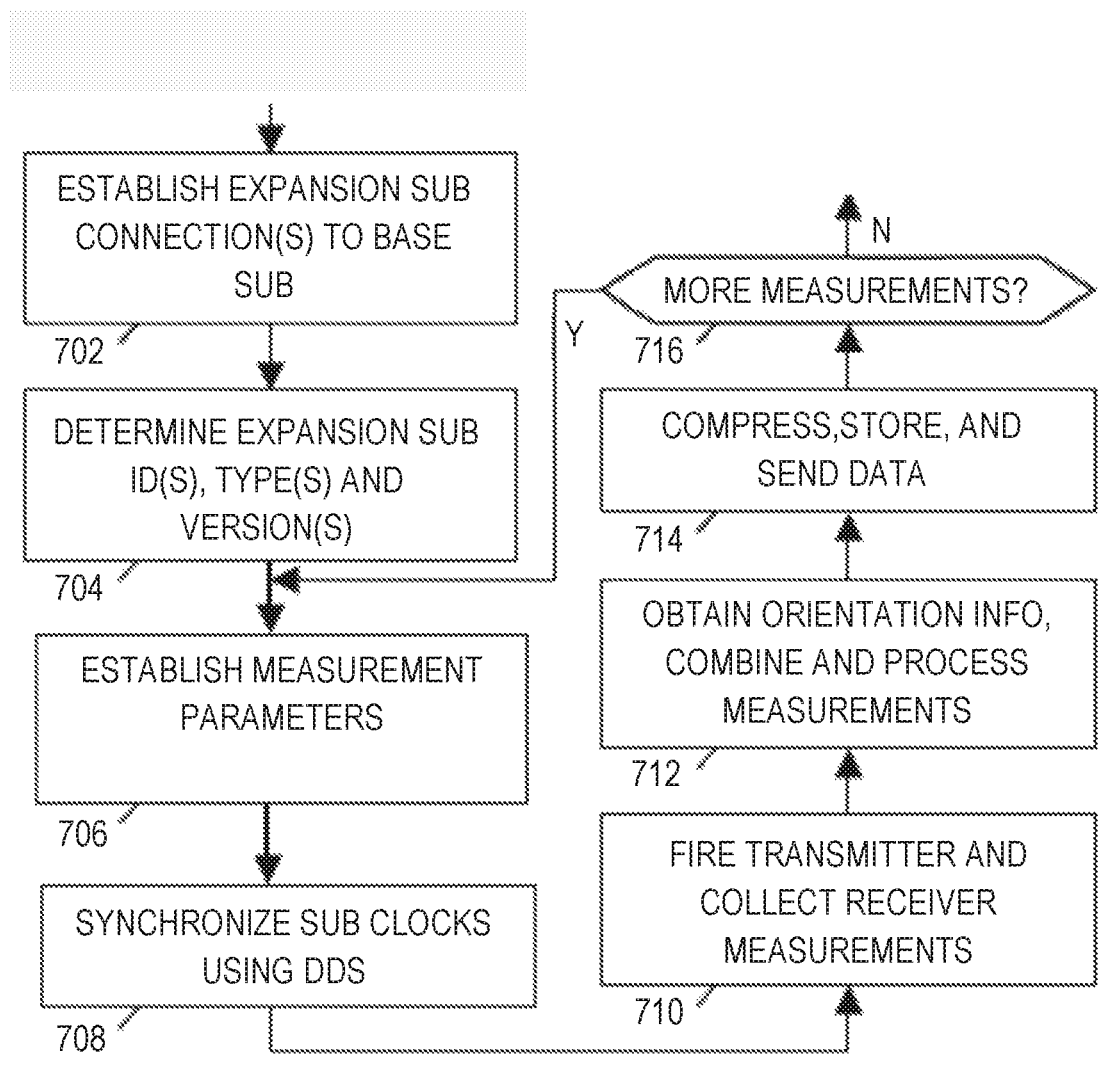
FIG. 8 is a flowchart showing an illustrative logging method.

FIG. 8 is a flowchart showing an illustrative logging method 700. In at least some embodiments, the method 700 is performed using a downhole modular tool 2 as described herein. At block 702, one or more extension subs are coupled to the base sub. In some embodiments, the extension subs are threaded into the bottomhole assembly or tool string adjacent with the base sub, while in other embodiments, one or more intermediate tubulars and/or logging tools are positioned between or interspersed among the base sub and the one or more extension subs. Electrical contacts in the connectors establish the tool bus connections for internal conductor(s) that enable the subs to convey power, communications, or sync signals to each other. Wireless communications and conveyance of sync signals is another option.

At block 704 the base sub identifies each of the extension subs to which it is coupled. Each extension sub preferably includes a preprogrammed unique identifier, along with some indication of the sub type (e.g., transmitter, receiver, antenna orientation, and single or differential configuration) and version number to enable this identification process to be performed automatically by the base sub. However, custom configuration or programming by a field engineer can also be used as a method for setting up the tool.

At block 706, the base sub establishes the measurement parameters and communicates them to the relevant extension subs. For example, the measurement parameters may specify the transmitter antenna, the desired frequency and power setting, and the desired firing time. Where pulse signals are employed, the shape and duration of the pulse may also be specified.

At block 708, the base sub initiates a clock synchronization procedure (e.g., a synchronization mode) that involves a DDS as described herein. To ensure measurement accuracy, the synchronization process may be repeated or refined before each measurement or based on predetermined sync criteria. In at least some embodiments, the clock synchronization process achieves full phase synchronization. As such, the base sub and extension sub also achieve synchronization of clock, frequency, time, etc. in addition to phase. Once the base sub and extension sub are synchronized, the tool may exit the synchronization mode and enter a communication or measurement mode. In some alternative embodiments, a continuous synchronization in a separate frequency band is possible. Also, a communications channel that coexists with other bus communications and operations of the downhole modular tool 2 is possible.

At block 710, the transmitter fires and related receivers measure phase/phase shift and/or amplitude/attenuation resulting from the transmitted signal interacting with the downhole formation. The base sub communicates with each of the extension subs to collect the receiver measurements or and/or related parameters. Information regarding the transmitted signal (e.g., time of transmission, amplitude, and phase) may also be collected.

At block 712, the base sub determines the tool orientation and processes the phase and attenuation measurements accordingly. In some embodiments, the tool rotates as it collects measurements. The measurements are sorted into azimuthal bins and combined with other measurements from that bin. Measurement error can be reduced by combining measurements in this fashion due to the effect of averaging. The base sub processes the measurements to determine azimuthal and radial dependence of the measurements, and may further generate a geosteering signal by taking the difference between measurements at opposite orientations or between the measurements for a given bin and the average of all bins.

At block 714, the base sub optionally compresses the data before storing it in internal memory and/or provides the data to the telemetry transmitter to be communicated to the surface. At block 716, the base sub determines if logging should continue, and if so, the operations are repeated beginning at block 702.

Figure 9:
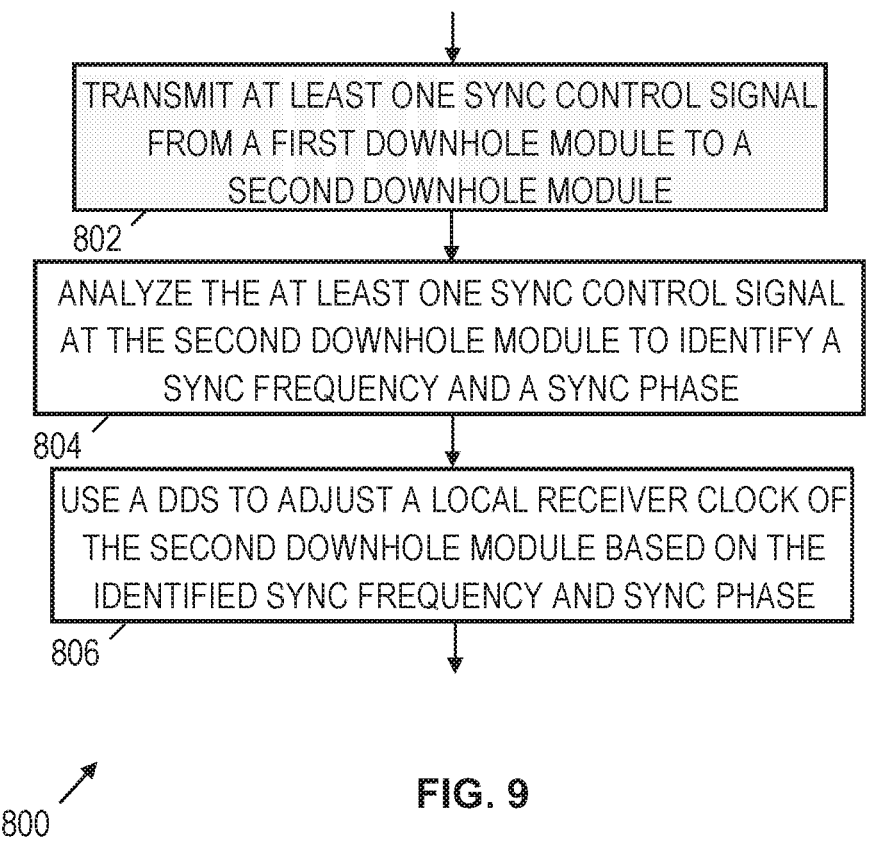
FIG. 9 is a flowchart showing an illustrative method with downhole synchronization based on a DDS.

FIG. 9 is a flowchart showing an illustrative method 800 with downhole synchronization based on a DDS. The method 800 may be performed, for example, by a modular downhole tool 2 as described herein. At block 802, at least one sync control signal is transmitted from a first downhole module to a second downhole module. At block 804, the at least one sync control signal is analyzed at the second downhole module to identify a sync frequency and a sync phase. At block 806, a DDS is used to adjust a local receiver clock of the second downhole module based on the identified sync frequency and sync phase. In different embodiments, the at least one sync control signal is transmitted in response to a predetermined sync criteria for a downhole logging tool. Further, the analysis of the at least one sync control signal may vary for different embodiments of a sync module. For example, a sync module of the second downhole module may include a phase detector that outputs an analog signal to indicate phase error. Alternatively, the sync module of the second downhole module may include a phase detector that outputs at least one digital signal to indicate phase error. Alternatively, the sync module of the second downhole module may include a counter to determine a pulse duration that is used to identify a sync frequency. Other components and options are possible as described herein.

Embodiments disclosed herein include:

A: A system with downhole synchronization, the system comprising a first module having a transmitter that transmits at least one sync control signal. The system also comprises a second module having a sync module with a DDS. The sync module analyzes the at least one sync control signal to identify at least one of a sync frequency and a sync phase. The DDS adjusts a local receiver clock based on the identified at least one of a sync frequency and a sync phase.

B: A method with downhole synchronization, the method comprising transmitting at least one sync control signal from a first downhole module to a second downhole module. The method also comprises analyzing the at least one sync control signal at the second downhole module to identify at least one of a sync frequency and a sync phase. The method also comprises using a DDS to adjust a local receiver clock of the second downhole module based on the identified at least one of a sync frequency and a sync phase.

Each of the embodiments, A and B, may have one or more of the following additional elements in any combination. Element 1: wherein the DDS adjusts a frequency of the local receiver clock without adjusting the phase of the local receiver clock. Element 2: wherein the DDS adjusts a phase of the local receiver clock without adjusting the frequency of the local receiver clock. Element 3: wherein the at least one sync control signal comprises a sync clock that is transmitted in response to a predetermined sync criteria. Element 4: wherein the at least one sync control signal comprises a first pulse to signal a sync frequency and a second pulse, separate from the first pulse, to signal a sync phase. Element 5: wherein the sync module comprises a phase detector that outputs an analog signal to indicate phase error, a low pass filter, and an analog-to-digital converter that outputs a digitized phase error to a processor in communication with the DDS. Element 6: wherein the sync module comprises a phase detector that outputs at least one digital signal to indicate phase error. Element 7: wherein the sync module comprises a counter and a processor, wherein the counter determines a pulse duration or width of the at least one sync control signal and wherein the processor identifies the sync frequency based on the determined pulse duration or width. Element 8: wherein the local receiver clock is used to sample logging tool measurements transmitted by the transmitter of first module and received by a receiver of the second module, and wherein an amplitude or phase of the sampled logging tool measurements are analyzed to determine a downhole formation property. Element 9: wherein the first module is part of a first downhole sub and the second module is part of a second downhole sub. Element 10: wherein the first downhole sub and second downhole sub are coupled through one or more intervening downhole subs.

Element 11: wherein said using the DDS comprises adjusting a frequency of the local receiver clock independently of adjusting the phase of the local receiver clock. Element 12: wherein said using the DDS comprises adjusting a phase of the local receiver clock independently of adjusting the frequency of the local receiver clock. Element 13: wherein transmitting the at least one sync control signal comprises transmitting a sync clock in response to a predetermined sync criteria for a downhole logging tool. Element 14: wherein transmitting the at least one sync control signal comprises transmitting a first pulse that signals a sync frequency and a second pulse, separate from the first pulse, that signals a sync phase. Element 15: wherein analyzing the at least one sync control signal comprises outputting an analog signal to indicate phase error. Element 16: wherein analyzing the at least one sync control signal comprises outputting at least one digital signal to indicate phase error. Element 17: wherein analyzing the at least one sync control signal comprises using a counter to determine a pulse duration or width and identifying the sync frequency based on the pulse duration or width. Element 18: further comprising using the local receiver clock to sample logging tool measurements transmitted by the first downhole module and received by the second downhole module, and processing an amplitude or phase of the sampled logging tool measurements to determine a downhole formation property. Element 19: wherein the first downhole module is part of a first logging tool sub and the second downhole module is part of second logging tool sub.

Numerous other variations and modifications will become apparent to those skilled in the art once the above disclosure is fully appreciated. It is intended that the following claims be interpreted to embrace all such variations and modifications where applicable.

What is claimed is:

1. A system with downhole synchronization, the system comprising:
    a first transceiver having a transmitter that transmits at least one sync control signal during a synchronization mode; and
    a second transceiver having a sync module with a direct digital synthesizer (DDS) used in conjunction with either a phase detector or a counter, wherein the sync module analyzes the at least one sync control signal to identify at least one of a sync frequency and a sync phase, and wherein the DDS adjusts a local receiver clock based on the identified at least one of the sync frequency and the sync phase, wherein the synchronization mode is separate from a communication mode and using the DDS in the synchronization mode to limit transmissions of the at least one sync control signal.

2. The downhole system of claim 1, wherein the DDS adjusts a frequency of the local receiver clock without adjusting a phase of the local receiver clock.

3. The downhole system of claim 1, wherein the DDS adjusts a phase of the local receiver clock without adjusting a frequency of the local receiver clock.

4. The downhole system of claim 1, wherein the at least one sync control signal comprises a sync clock that is transmitted in response to a predetermined sync criteria in accordance with the synchronization mode.

5. The downhole system of claim 1, wherein the at least one sync control signal comprises a first pulse to signal the sync frequency and a second pulse, separate from the first pulse, to signal the sync phase.

6. The downhole system of claim 1, wherein the sync module comprises:
    the phase detector that outputs an analog signal to indicate phase error;
    a low pass filter; and
    an analog-to-digital converter that outputs a digitized phase error to a processor in communication with the DDS.

7. The downhole system of claim 1, wherein the sync module comprises the phase detector that outputs at least one digital signal to indicate phase error.

8. The downhole system of claim 1, wherein the counter determines a pulse duration or width of the at least one sync control signal and wherein a processor identifies the sync frequency based on the determined pulse duration or width.

9. The downhole system according claim 1, wherein the first transceiver is part of a first downhole sub and the second transceiver is part of a second downhole sub.

10. The downhole system of claim 9, further comprising a communication bus and the first downhole sub is configured to transmit the at least one sync control signal via the communication bus, wherein the first downhole sub and second downhole sub are coupled through one or more intervening downhole subs via the communication bus, and the intervening downhole subs use the at least one sync control signal for synching with the first downhole sub.

11. A method with downhole synchronization, the method comprising:
    periodically transmitting at least one sync control signal from a first downhole module to a second downhole module during a synchronization mode;
    analyzing the at least one sync control signal at the second downhole module to identify at least one of a sync frequency and a sync phase; and
    using a direct digital synthesizer (DDS) in conjunction with either a phase detector or a counter to adjust a local receiver clock of the second downhole module based on the identified at least one of the sync frequency and the sync phase, wherein the synchronization mode is separate from a communication mode, and using the DDS in the synchronization mode to limit transmissions of the at least one sync control signal.

12. The method of claim 11, wherein said using the DDS comprises adjusting a frequency of the local receiver clock independently of adjusting a phase of the local receiver clock.

13. The method of claim 11, wherein said using the DDS comprises adjusting a phase of the local receiver clock independently of adjusting a frequency of the local receiver clock.

14. The method of claim 11, wherein said periodically transmitting the at least one sync control signal comprises transmitting a sync clock in response to a predetermined sync criteria for a downhole logging tool.

15. The method of claim 11, wherein said transmitting the at least one sync control signal comprises transmitting a first pulse that signals the sync frequency and a second pulse, separate from the first pulse, that signals the sync phase.

16. The method of claim 11, wherein said analyzing the at least one sync control signal comprises outputting an analog signal to indicate phase error.

17. The method of claim 11, wherein said analyzing the at least one sync control signal comprises outputting at least one digital signal to indicate phase error.

18. The method of claim 11, wherein said analyzing the at least one sync control signal comprises using the counter to determine a pulse duration or width and identifying the sync frequency based on the pulse duration or width.

19. The method according to claim 11, further comprising:
   using the local receiver clock to sample logging tool measurements transmitted by the first downhole module and received by the second downhole module; and
   processing an amplitude or phase of the sampled logging tool measurements to determine a downhole formation property.

20. The method according to claim 11, wherein the first downhole module is part of a first logging tool sub and the second downhole module is part of a second logging tool sub.

\* \* \* \* \*